(12) United States Patent
Hidaka

(10) Patent No.: US 8,260,284 B2
(45) Date of Patent: Sep. 4, 2012

(54) COMMUNICATION SYSTEM RADIO COMMUNICATION TERMINAL, AND RADIO BASE STATION

(75) Inventor: Hiroyuki Hidaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/538,262

(22) PCT Filed: Dec. 10, 2003

(86) PCT No.: PCT/JP03/15784
§ 371 (c)(1),
(2), (4) Date: Feb. 6, 2006

(87) PCT Pub. No.: WO2004/054206
PCT Pub. Date: Jun. 24, 2004

(65) Prior Publication Data
US 2006/0183483 A1    Aug. 17, 2006

(30) Foreign Application Priority Data
Dec. 10, 2002    (JP) .............................. P. 2002-357977

(51) Int. Cl.
*H04W 4/00* (2009.01)
(52) U.S. Cl. ................ 455/422.1; 455/435.1; 455/435.2
(58) Field of Classification Search ................ 455/421.1
See application file for complete search history.

(56) References Cited

U.S. PATENT DOCUMENTS

| 6,701,129 | B1 * | 3/2004 | Hashem et al. | 455/67.11 |
| 6,745,049 | B1 * | 6/2004 | Uchida et al. | 455/560 |
| 2003/0166394 | A1 * | 9/2003 | Tsien et al. | 455/67.1 |

FOREIGN PATENT DOCUMENTS

| JP | 11-308653 | 11/1999 |
| JP | 2000101580 A | 4/2000 |
| JP | 2000152337 A | 5/2000 |
| JP | 2001308956 A | 11/2001 |
| JP | 2002-171213 | 6/2002 |
| JP | 2002-199438 | 7/2002 |
| JP | 2002204470 A | 7/2002 |
| JP | 3334753 | 8/2002 |
| JP | 3362119 | 10/2002 |

OTHER PUBLICATIONS

Japanese language office action and its English language translation for corresponding Japanese application 2006332351 lists the references above.

* cited by examiner

*Primary Examiner* — Kamran Afshar
*Assistant Examiner* — Sayed T Zewari
(74) *Attorney, Agent, or Firm* — DLA Piper LLP (US)

(57) ABSTRACT

In a wireless communication system configured from a wireless base station and a wireless communication terminal, wherein a wireless communication line is set between the wireless base station and the wireless communication terminal, the wireless base station includes a wireless base station transmission rate broadcast section that notifies the wireless communication terminal of a transmission rate that enables to be supported by the wireless base station on the wireless communication line from the wireless communication terminal to the wireless base station, and the wireless communication terminal includes a storage section that stores a transmission rate required by the wireless communication terminal on the wireless communication line from the wireless communication terminal to the wireless base station; a transmission rate comparison section that compares the transmission rate notified from the wireless base station with the transmission rate stored in the storage section; and a transmission rate determination section that determines a transmission rate on the wireless communication line from the wireless communication terminal to the wireless base station based on a comparison result of the transmission rate comparison section.

16 Claims, 10 Drawing Sheets

FIG. 3

| FIELD | LENGTH (BITS) |
|---|---|
| MESSAGE ID | 8 |
| TRANSACTION ID | 8 |
| ATTRIBUTE RECORD | ATTRIBUTE DEPENDENT |

*FIG. 4*

ATTRIBUTE RECORD

| FIELD | LENGTH (BITS) | DEFAULT |
|---|---|---|
| LENGTH | 8 | N/A |
| ATTRIBUTE ID | 8 | N/A |
| REVERSE TRAFFIC CHANNEL START | 8 | 1 |

FIG. 5

REVERSE TRAFFIC CHANNEL START

| VALUE | MEANING |
|---|---|
| 0 x 01 | 9.6 kbps |
| 0 x 02 | 19.2 kbps |
| 0 x 03 | 38.4 kbps |
| 0 x 04 | 76.8 kbps |
| 0 x 05 | 153.6 kbps |

FIG. 7

| FIELD | LENGTH (BITS) |
|---|---|
| MESSAGE ID | 8 |
| ACCESS CYCLE DURATION | 8 |
| ACCESS SIGNATURE | 16 |
| OPEN LOOP ADJUST | 8 |
| PROBE INITIAL ADJUST | 5 |
| PROBE NUM STEP | 4 |
| POWER STEP | 4 |
| PROBE LENGTH | 3 |
| CAPSULE LENGTH MAX | 4 |

$N_{ACMPA\ PERSIST}$ OCCURENCES OF THE FOLLOWING FIELD:

| | |
|---|---|
| AP PERSISTENCE | 6 |

| | |
|---|---|
| RTC START RATE CHANGE ENABLED | 1 |
| REVERSE TRAFFIC CHANNEL START | 7 |
| RESERVED | VARIABLE |

COMMUNICATION SYSTEM RADIO COMMUNICATION TERMINAL, AND RADIO BASE STATION

TECHNICAL FIELD

The invention relates to a wireless communication system which performs data communications, and more particularly, to a wireless communication system wherein transmission rate in a radio zone can be changed.

BACKGROUND ART

In recent years, transmission capacity of a communication channel has been increased in a mobile communication network too. In the mobile communication network, not only text data and HTTP data as in an e-mail but also data whose amount is large such as picture or movie are transmitted.

It is considered that data whose amount is large and which is required to transmit in real time will be bidirectionally transmitted for applications such as IP telephone (VoIP) and videoconference in the future.

For example, a high speed communication network system using 1xEVDO (1x Evolution Data Only) system which is a mobile communication system dedicated to data communications is proposed.

In the system, a wireless base station transmits packets to each communication terminal being in the cover area of the wireless base station. Each communication terminal measures link quality of a downlink (for example, CIR (Carrier-to-Interference Ratio)) based on a pilot signal involved in reception packet.

Each communication terminal selects a communication mode wherein the communication terminal enables to perform high speed communications most efficiently in the measured link quality. Each communication terminal further transmits DRC information (Data Rate Control signal) representing the selected communication mode to the wireless base station.

The wireless base station refers to the DRC information transmitted from each communication terminal and allocates communication resources preferentially to the communication terminals with the better link quality.

Accordingly, since data is transmitted to the communication terminal with good link quality at a high transmission rate, required time for the communication can be shortened. Since data is transmitted to the communication terminal with poor link quality at a low transmission rate, error resilient can be enhanced.

The transmission rate of uplink (from wireless communication terminal to wireless base station) in the 1xEVDO system is determined based on the state of the wireless communication terminal and the wireless base station and is controlled.

That is, the transmission rate of uplink in 1xEVDO is selected from among 9.6 kbps, 19.2 kbps, 38.4 kbps, 76.8 kbps, and 153.6 kbps. The terminal sets the transmission rate of uplink to the lowest value 9.6 kbps at the communication start time.

This value is updated according to the maximum transmission rate information in broadcast information sent from the wireless base station.

That is, the transmission rate of the wireless communication terminal is set to 9.6 kbps in accordance with the maximum transmission rate just after the operation is started after power of the wireless communication terminal is turned on.

After communications are started, the wireless communication terminal performs an update test of the transmission rate at a given period within the range of the maximum transmission rate information sent from the wireless base station.

If the currently communicating wireless base station permits an increase in the transmission rate, the current transmission rate is maintained or can make a transition to one-higher step according to the result of the transmission rate update test.

On the other hand, if the currently communicating wireless base station does not permit an increase in the transmission rate, the current transmission rate is maintained or can make a transition to one lower step according to the result of the transmission rate update test.

FIG. 9 shows an example wherein the transmission rate of the wireless communication terminal is changed in accordance with the algorithm described above.

In the transmission rate in the related art shown in FIG. 9, the maximum transmission rate of the wireless communication terminal is set to 9.6 kbps at the communication start time. Therefore, the uplink transmission rate is also 9.6 kbps.

Thereafter, the wireless communication terminal receives the broadcast information sent from the wireless base station, and the maximum transmission rate of the wireless communication terminal is updated to 153.6 kbps. But, the current transmission rate is maintained until the next update timing.

If the wireless communication terminal succeeds in increasing the transmission rate at the update timing, the transmission rate of the wireless communication terminal becomes 19.2 kbps which is the next transmission rate step to 9.6 kbps.

Then, if the wireless communication terminal fails increasing the transmission rate, the current transmission rate is maintained. If the wireless communication terminal succeeds in increasing the transmission rate, the transmission rate makes a transition to one higher step.

Thus, if the wireless base station permits a high transmission rate, the uplink transmission rate increases only stepwise.

Patent document 1: JP-A-2002-171213

However, in the determination method of the uplink transmission rate described above, the communications are started at the lowest transmission rate and the transmission rate is increased stepwise.

This system does not involve any problem in use of application wherein the amount of data transmitted on the uplink is small such as WEB browsing or FTP downloading.

However, in application wherein a large amount of data is transmitted and a constant transmission rate is required also on the uplink such as IP telephone (VoIP) or videoconference, it takes time that the uplink transmission rate reaches a speed required for the operation of the application. Thus, it takes time that the application can be used just after starting communications.

For example, as shown in FIG. 9, if the operation of the application requires the transmission rate 64 kbps or higher, the application cannot be used until the transmission rate becomes 64 kbps or higher (arrives at 76.8 kbps) after connection is established.

FIG. 10 shows a data communication sequence in the communication system of the related art.

When a connection request is issued from an application (App) installed in a wireless communication terminal to the wireless communication terminal (AT: Access Terminal), the connection request is sent from the wireless communication terminal to a wireless base station (AP: Access Point).

Then, after a wireless communication line is established between the wireless communication terminal and the wireless base station, the application transmits data to a server (Serv).

However, since the initial value of the uplink transmission rate of the wireless communication line between the wireless communication terminal and the wireless base station is set to 9.6 kbps, the data transmitted from the application via the wireless communication terminal and the wireless base station cannot be decoded in the server. Therefore, the application cannot normally operate.

Thereafter, even if the uplink transmission rate increases to 19.2 kbps and 38.4 kbps, the application requiring the transmission rate 64 kbps or higher cannot normally operate at the transmission rate 19.2 kbps, 38.4 kbps.

Then, when the uplink transmission rate reaches 76.8 kbps, in the application requiring the transmission rate 64 kbps or higher, the data transmitted from the application can be decoded in the server. Therefore, the application starts to operate normally.

Particularly, in the 1xEVDO system, maintaining the current transmission rate or making a transition to one higher step is selected as probability according to the result of the transmission rate update test.

Consequently, a time of about 10 seconds may be required by the time the transmission rate increases from the initial value 9.6 kbps to 76.8 kbps depending on the result of the transmission rate update test. That is, time is required by the time the application starts to operate.

DISCLOSURE OF INVENTION

The object of the invention is to provide a communication system in which the uplink transmission rate rapidly increases from the communication start time to enable to use application rapidly.

A first invention is characterized in that by a wireless communication system configured from a wireless base station and a wireless communication terminal, wherein a wireless communication line is set between the wireless base station and the wireless communication terminal, the wireless base station has: a wireless base station transmission rate broadcast section that notifies the wireless communication terminal of a transmission rate that enables to be supported by the wireless base station on the wireless communication line from the wireless communication terminal to the wireless base station, and the wireless communication terminal has: a storage section that stores a transmission rate required by the wireless communication terminal on the wireless communication line from the wireless communication terminal to the wireless base station; and a transmission rate determination section that determines a transmission rate on the wireless communication line from the wireless communication terminal to the wireless base station based on a result of comparing the transmission rate notified from the wireless base station with the transmission rate stored in the storage section.

A second invention is characterized by a wireless communication system configured from a wireless base station and a wireless communication terminal, wherein a wireless communication line is set between the wireless base station and the wireless communication terminal, the wireless communication terminal has: a terminal transmission rate broadcast section that notifies the wireless base station of a transmission rate required by the wireless communication terminal on the wireless communication line from the wireless communication terminal to the wireless base station when the wireless base station and the wireless communication terminal exchange their mutual state information; and a transmission rate determination section that determines a transmission rate on the wireless communication line from the wireless communication terminal to the wireless base station, and the wireless base station has: a determination section that determines whether or not the transmission rate notified from the wireless communication terminal enables to be supported; and a determination result broadcast section that notifies the wireless communication terminal of a determination result of the determination section, wherein the transmission rate determination section determines the transmission rate on the wireless communication line from the wireless communication terminal to the wireless base station based on the determination result notified from the wireless base station.

A third invention is characterized by the wireless communication system according to the second invention, wherein the wireless communication terminal notifies the wireless base station of the transmission rate required by the wireless communication terminal on the wireless communication line from the wireless communication terminal to the wireless base station when power of the wireless communication terminal is turned on, and determines the transmission rate on the wireless communication line from the wireless communication terminal to the wireless base station based on the determination result notified from the wireless base station.

A fourth invention is characterized by the wireless communication system according to the second or third invention, wherein the terminal transmission rate broadcast section notifies the wireless base station of a state information request message including the transmission rate required by the wireless communication terminal on the wireless communication line from the wireless communication terminal to the wireless base station.

A fifth invention is characterized by the wireless communication system according to the fourth invention, wherein the wireless communication terminal has a request transmission rate transmission section that retransmits a request of a transmission rate lower than the transmission rate required by the wireless communication terminal when the determination result from the wireless0-base station section shows that the transmission rate does not enable to be supported.

A sixth invention is characterized by a wireless communication terminal, wherein a wireless communication line is set between a wireless base station and the wireless communication terminal, having: a storage section that stores a transmission rate required by the wireless communication terminal on the wireless communication line from the wireless communication terminal to the wireless base station; a transmission rate information acquisition section that receives a transmission rate that enables to be supported by the wireless base station on the wireless communication line from the wireless communication terminal to the wireless base station, notified from the wireless base station; a transmission rate comparison section that compares the transmission rate notified from the wireless base station with the transmission rate stored in the storage section; and a transmission rate determination section that determines a transmission rate on the wireless communication line from the wireless communication terminal to the wireless base station based on a comparison result of the transmission rate comparison section.

A seventh invention is characterized by a wireless communication terminal, wherein a wireless communication line set between a wireless base station and the wireless communication terminal, having: a terminal transmission rate broadcast section that notifies the wireless base station of a transmission rate required by the wireless communication terminal on the wireless communication line from the wireless communication terminal to the wireless base station when the wireless base station and the wireless communication terminal exchange their mutual state information; and a transmission rate determination section that determines a transmission rate on the wireless communication line from the wireless communication terminal to the wireless base station based on a determination result as to whether or not the wireless base station enables to support the transmission rate notified from the wireless communication terminal.

An eighth invention is characterized by the wireless communication terminal according to the seventh invention, wherein when power of the wireless communication terminal is turned on, the wireless communication terminal notifies the wireless base station of the transmission rate required by the wireless communication terminal on the wireless communication line from the wireless communication terminal to the wireless base station, and determines the transmission rate on the wireless communication line from the wireless communication terminal to the wireless base station based on the determination result notified from the wireless base station.

A ninth invention is characterized by the wireless communication terminal according to the seventh or eighth invention, wherein the terminal transmission rate broadcast section notifies the wireless base station of a state information request message including the transmission rate required by the wireless communication terminal on the wireless communication line from the wireless communication terminal to the wireless base station.

A tenth invention is characterized by the wireless communication terminal according to the ninth invention, having: a request transmission rate transmission section that retransmits a request of a transmission rate lower than the transmission rate required by the wireless communication terminal when the determination result from the wireless base station section shows that the transmission rate does not enable to be supported.

An eleventh invention is characterized by a wireless base station, wherein a wireless communication line is set between the wireless base station and a wireless communication terminal, for performing communications, having: a wireless base station transmission rate broadcast section that notifies the wireless communication terminal of a transmission-rate that enables to be supported by the wireless base station on the wireless communication line from the wireless communication terminal to the wireless base station.

A twelfth invention is characterized by a transmission rate control method of a wireless communication system configured from a wireless base station and wireless communication terminal, wherein a wireless communication line is set between the wireless base station and the wireless communication terminal, the transmission rate control method includes the steps in which: the wireless base station notifies the wireless communication terminal of a transmission rate that enables to be supported by the wireless base station on the wireless communication line from the wireless communication terminal to the wireless base station; the wireless communication terminal stores a transmission rate required by the wireless communication terminal on the wireless communication line from the wireless communication terminal to the wireless base station; and the wireless communication terminal determines a transmission rate on the wireless communication line from the wireless communication terminal to the wireless base station based on a result of comparing the transmission rate notified from the wireless base station with the transmission rate stored in the wireless communication terminal.

A thirteenth invention is characterized by a transmission rate control method of a wireless communication system configured from a wireless base station and a wireless communication terminal, wherein a wireless communication line is set between the wireless base station and the wireless communication terminal the transmission rate control method includes the steps in which: the wireless communication terminal notifies the wireless base station of a transmission rate required by the wireless communication terminal on the wireless communication line from the wireless communication terminal to the wireless base station when the wireless base station and the wireless communication terminal exchange their mutual state information; the wireless communication terminal determines a transmission rate on the wireless communication line from the wireless communication terminal to the wireless base station; the wireless base station determines whether or not the transmission rate notified from the wireless communication terminal enables to be supported; the wireless base station notifies the wireless communication terminal of a determination result of the determination section; and the wireless communication terminal determines the transmission rate on the wireless communication line from the wireless communication terminal to the wireless base station based on the determination result notified from the wireless base station.

A fourteenth invention is characterized by the transmission rate control method according to the thirteenth invention, wherein the wireless communication terminal notifies the wireless base station of the transmission rate required by the wireless communication terminal on the wireless communication line from the wireless communication terminal to the wireless base station when power of the wireless communication terminal is turned on, and determines the transmission rate on the wireless communication line from the wireless communication terminal to the wireless base station based on the determination result notified from the wireless base station.

A fifteenth invention is characterized by the wireless communication system according to the thirteenth or fourteenth invention, wherein the terminal transmission rate broadcast section notifies the wireless base station of a state information request message including the transmission rate required by the wireless communication terminal on the wireless communication line from the wireless communication terminal to the wireless base station.

A sixteenth invention is characterized by the wireless communication system according to the fifteenth invention, wherein the wireless communication terminal retransmits a request of a transmission rate lower than the transmission rate required by the wireless communication terminal when the determination result from the wireless base station section shows that the transmission rate does not enable to be supported.

BRIEF DESCRIPTION OF DRAWINGS

FIG. 3 is a schematic representation of the description of Access Parameters in the first embodiment of the invention;

FIG. 4 is a schematic representation of the description of Access Parameters in the first embodiment of the invention;

FIG. 5 is a schematic representation of the description of ReverseTrafficChannelStart (uplink speed information) in the first embodiment of the invention;

FIG. 7 is a schematic representation of the description of Configuration Response in the second embodiment of the invention;

BEST MODE FOR CARRYING OUT THE INVENTION

Embodiments of the invention will be described with reference to the accompanying drawings.

Figure 1:
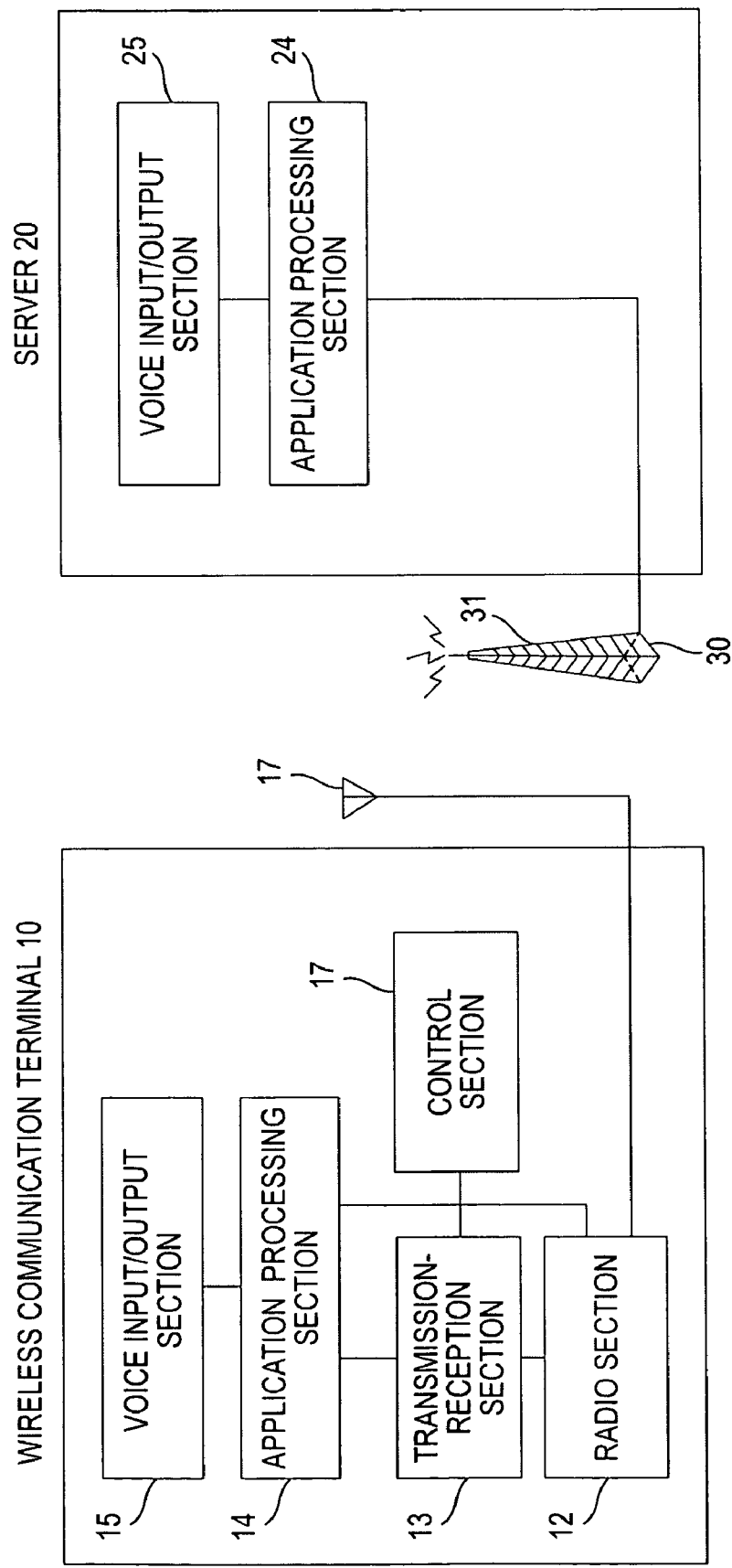
FIG. 1 is a block diagram to show the configuration of a wireless communication system of an embodiment of the invention.

FIG. 1 is a block diagram to show the configuration of a wireless communication system of an embodiment of the invention.

A wireless communication terminal 10 is connected to a server 20 through a wireless base station 30. Data required to transmit in real time is transmitted and received between the wireless communication terminal 10 and the server 20. Application requiring real-time processing such as IP telephone or streaming is operated in both of the wireless communication terminal 10 and the server 20.

The wireless communication terminal 10 is a mobile telephone or a PDA (Personal Digital Assistant) capable of performing data communications, a computer to which a data communication card involving a radio is added, or the like.

The wireless communication terminal 10 has an antenna 11 for receiving a radio wave (downlink signal) sent from the wireless base station 30 and transmitting a radio wave (uplink signal) to the wireless base station 30. The antenna 11 is connected to a radio section 12.

The radio section 12 has a transmission section and a reception section. The transmission section generates a high-frequency signal to be transmitted from the antenna 11. The reception section executes amplification, frequency conversion, etc., of the high-frequency signal received by the antenna 11 to output as a baseband signal to a transmission-reception section 13.

The transmission-reception section 13 includes a modem circuit and a CODEC section. The baseband signal is demodulated by a demodulation circuit.

The demodulated signal is sent to the CODEC section, and is then decoded into a data signal by the CODEC section.

The CODEC section also codes the data signal. The coded signal is sent to the modem circuit, and is then modulated by the modem circuit.

The modulated signal is converted into a high-frequency signal by the radio section (transmission section) 13. The high-frequency signal is transmitted from the antenna 11.

The data processed by the transmission-reception section 13 is sent to an application processing section 14.

In the application processing section 14, a program requiring the real-time processing such as IP telephone operates and processes the data processed by the transmission-reception section 13 in real time and sends the data to a voice input/output section 15 for output as a voice signal.

A voice signal input to the voice input/output section 15 is processed in real time by the program operating in the application processing section 14 and is sent to the transmission-reception section 13, which then transmits the signal to the server 20 through the radio section 12 and the antenna 11.

A control section 17 controls each section of the wireless communication terminal 10 such as the radio section 12 and the transmission-reception section 13.

Specifically, the control section 17 controls the transmission-reception frequency and the transmission-reception timing with a channel specified for the radio section 12.

The control section 17 generates various control signals of setting, releasing, position registration, etc., of the wireless communication line between the wireless communication terminal 10 and the wireless base station 30 in accordance with a predetermined communication protocol. The control section 17 controls transmission and reception of the signals.

Further, since the wireless communication network is a 1xEVDO network in the embodiment of the invention, the wireless communication terminal 10 transmits DRC information which is a signal indicating a communication mode selected as the mode capable of efficiently performing data communications based on the CIR found by receiving a signal transmitted from the wireless base station 30 (for example, a pilot signal, a control packet, etc.,) to the wireless base station 30 as wireless communication link quality information.

The wireless communication terminal 10 determines the transmission rate of the wireless communication line (uplink) to the wireless base station 30 based on the state of the wireless communication terminal 10 and the wireless base station 30.

The wireless base station 30 has an antenna 31 connected to a radio section and receives a radio wave (uplink signal) sent from the wireless communication terminal 10 and transmits a radio wave (downlink signal) to the wireless communication terminal 10.

The radio section has a transmission section and a reception section. The transmission section generates a high-frequency signal to be transmitted from the antenna 31. The reception section executes amplification, frequency conversion, etc., of the high-frequency signal received by the antenna 31 to output as a baseband signal to a transmission-reception section.

The transmission-reception section includes a modem circuit and a CODEC section. The baseband signal is demodulated by a demodulation circuit.

The demodulated signal is sent to the CODEC section, and is then decoded into a data signal by the CODEC section.

The CODEC section also codes the data signal. The coded signal is sent to the modem circuit, and is then modulated by the modem circuit.

The modulated signal is converted into a high-frequency signal by the transmission section. The high-frequency signal is transmitted from the antenna 31.

An interface section is connected to the transmission-reception section. The radio base station 30 is connected to a network such as the Internet through the interface section.

The wireless base station 30 includes a control section for controlling each section of the wireless base station 30 (the radio section, the transmission-reception section, the interface section, etc.).

Specifically, the control section controls the transmission-reception frequency and the transmission-reception timing with a channel specified for the radio section.

In response to a connection request from the wireless communication terminal, the control section controls permission and inhibition of the connection and the number of connected wireless communication terminals.

Further, since the wireless communication network is a 1xEVDO network in the embodiment of the invention, the wireless base station 30 determines the data communication bandwidth allocated to each client, and determines the transmission rate of the wireless communication line (downlink) to the wireless communication terminal 10, based on the quality information of the wireless communication transmitted from the wireless communication terminal 10 and the number of connected wireless communication terminals.

The server 20 is an apparatus with which the wireless communication terminal 10 communicates. A program corresponding to the application program operating in the wireless communication terminal 10 operates in the server 20.

The data sent from the wireless base station 30 through the interface section is sent to an application processing section 24.

In the application processing section 24, a program requiring the real-time processing such as IP telephone operates and processes the data sent from the wireless base station 30 in real time.

The data processed in real time by the program operating in the application processing section 24 is sent to the wireless base station 30, and is then transmitted to the wireless communication terminal 10 through the wireless base station 30.

Figure 2:
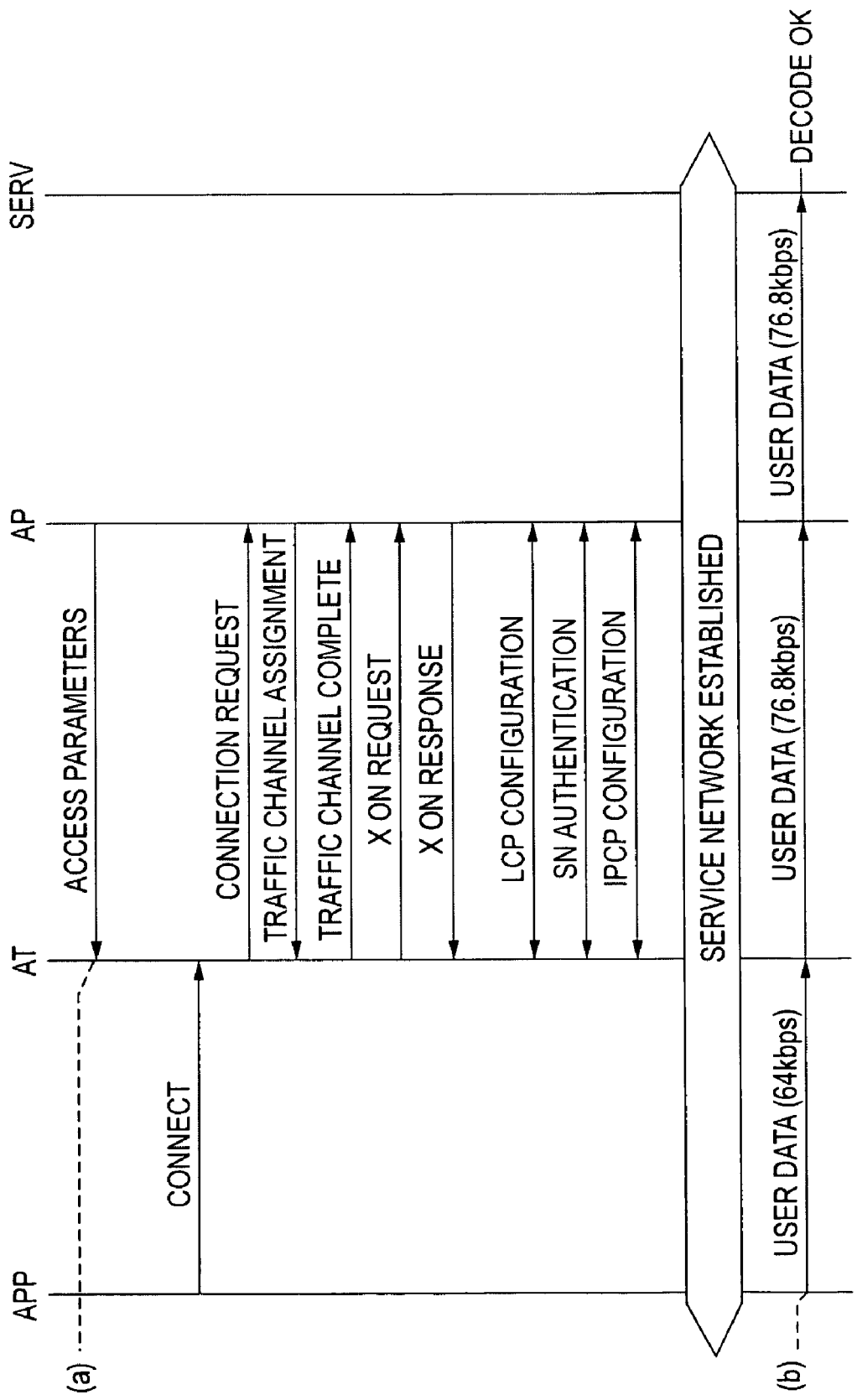
FIG. 2 is a sequence diagram of a communication system of a first embodiment of the invention.

FIG. 2 is a sequence diagram of the communication system of the first embodiment of the invention, and shows processing at the communication start time.

The wireless communication terminal (AT: Access Terminal) 10 receives access parameters (Access Parameters) transmitted at a predetermined timing from the wireless base station (AP: Access Point) 30 while the wireless communication terminal 10 is operating.

The access parameters involves information concerning the state of the wireless base station (function of the wireless base station, line traffic state, etc.).

In the wireless communication system of the embodiment of the invention, the wireless communication terminal receiving the access parameters refers to the uplink transmission rate that can be supported by the wireless base station involved in the access parameters, in order to set the uplink transmission rate to the required transmission rate in the range that can be supported by the wireless communication terminal.

For example, if 153.6 kbps is indicated in the access parameters, the uplink transmission rate is selected in the range up to 153.6 kbps by the operating application.

When a connection request is issued from an application program (App) operating in application processing section 14 installed in the wireless communication terminal to the wireless communication terminal, the connection request (Connection Request) is transmitted from the wireless communication terminal to the wireless base station.

In response to the request, the wireless base station specifies a communication channel (Traffic Channel Assignment), and the wireless communication terminal sets the communication channel and transmits a response signal (Traffic Channel Complete) to establish the communication channel.

Then, the wireless communication terminal requires a communication port in the communication channel (Xon Request), and the wireless base station specifies a communication port (Xon Response) and decides the communication port.

Then, user authentication, etc., is performed according to LCP Configuration, the communication function is set according to SN Authentication and IPIC Configuration, PPP (Point to Point Protocol) is set, and the communication between the application and the server (Sere) 20 is established.

Data is sent at speed of 64 kbps from the application to the wireless communication terminal because the application requires the transmission rate 64 kbps.

The wireless communication terminal transmits data at speed of 76.8 kbps to the wireless base station.

The uplink data speed is described in the header portion of a data packet transmitted from the wireless communication terminal to the wireless base station. The wireless base station which have received the data packet from the wireless communication terminal refers to the header of the data packet to identify the transmission rate of the packet.

The wireless base station transmits data to the server at the speed 76.8 kbps.

An application program requiring the transmission rate 64 kbps operates in the application processing section 24 of the server. The data is sent at the transmission rate 76.8 kbps from the wireless communication terminal to the server. Thus, the data can be decoded in the server and the application can operate normally.

FIGS. 3 and 4 show the description of the access parameters (Access Parameters) in the first embodiment of the invention.

As shown in FIG. 3, the access parameters are provided with an attribute record area (Attribute Record) following a message ID (Message ID) and a transaction ID (Transaction ID).

As shown in FIG. 4, the attribute record area involves length of attribute record area (Length), attribute ID (Attribute ID), and uplink speed information (ReverseTrafficChannelStart). The uplink speed information indicates the transmission rate of the uplink.

FIG. 5 shows the description of the uplink speed information (ReverseTrafficChannelStart) in the first embodiment of the invention.

Codes are defined for the uplink transmission rates (9.6 kbps, 19.2 kbps, 38.4 kbps, 76.8 kbps, and 153.6 kbps) that can be adopted in the 1xEVDO system. The wireless communication terminal 10 receiving a control message containing ReverseTrafficChannelStart can extract the code to obtain the uplink transmission rate information that can be supported by the wireless base station 30.

Figure 6:
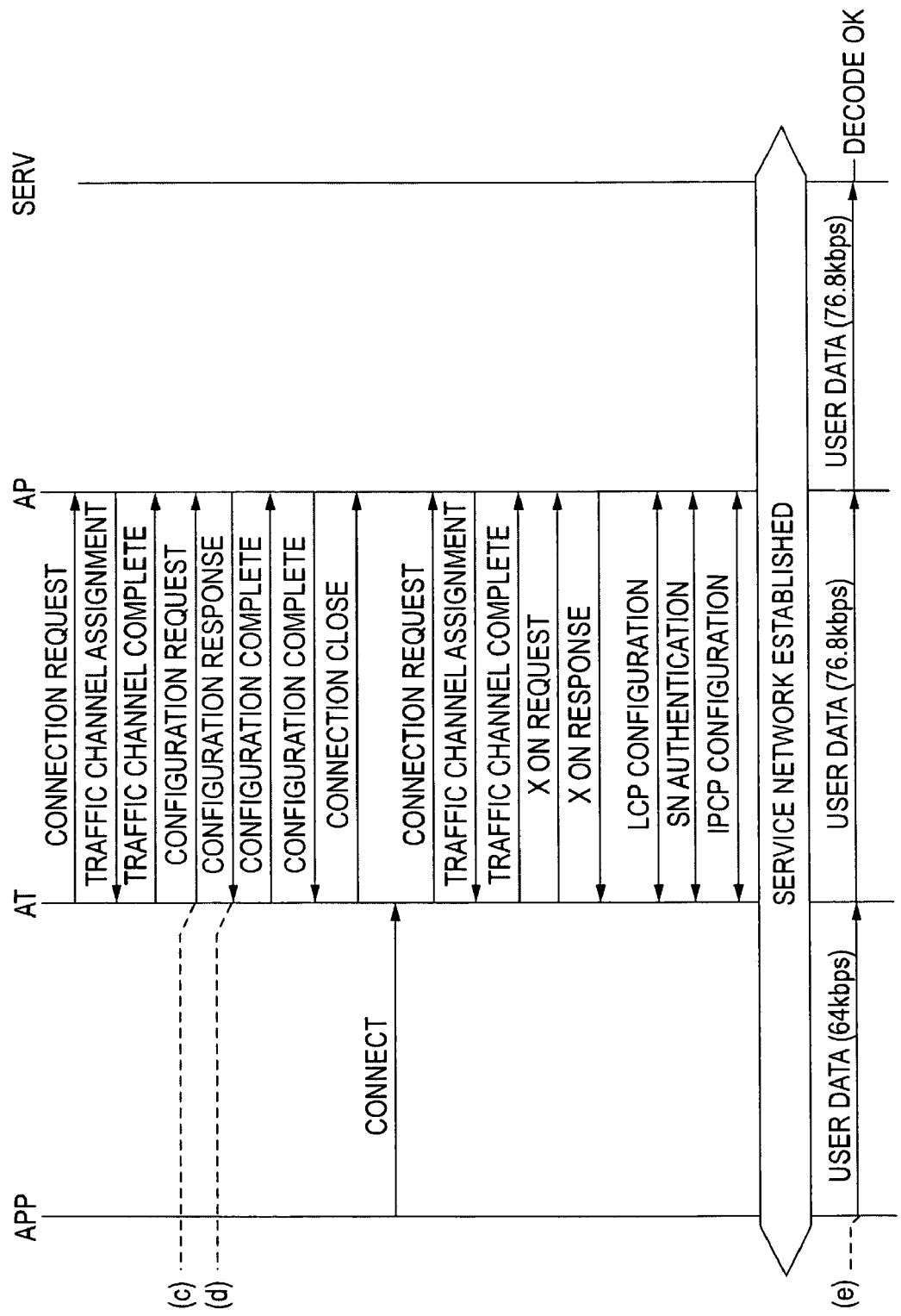
FIG. 6 is a sequence diagram of a communication system of a second embodiment of the invention.

FIG. 6 is a sequence diagram of a communication system of a second embodiment of the invention, and shows processing when power of a wireless communication terminal is turned on.

When the wireless communication terminal (AT: Access Terminal) 10 starts to operate as power is turned on, the wireless communication terminal 10 transmits a connection request (Connection Request) to a wireless base station.

In response to the request, the wireless base station specifies a communication channel (Traffic Channel Assignment), and the wireless communication terminal sets the communication channel and transmits a response signal (Traffic Channel Complete) to establish the communication channel.

Then, the wireless communication terminal transmits information reporting information of the state of the wireless communication terminal (function of wireless communication terminal, etc.) (Configuration Response) and requests the wireless base station to send information of the state of the wireless base station (Configuration Request).

In response to the request, the wireless base station sends information of the state of the wireless base station (function of the wireless base station, line traffic state, etc.) (Configuration Response). The wireless communication terminal which have received Configuration Response transmits an acknowledge signal (Configuration Complete), and the wireless base station also transmits an acknowledge signal (Configuration Complete).

Upon reception of Configuration Complete, the wireless communication terminal transmits a Connection Close signal for disconnecting the line because exchange of the state information (parameters) between the wireless communication terminal and the wireless base station is completed.

In the wireless communication system of the embodiment of the invention, the wireless communication terminal receiving Configuration Response sets the transmission rate to the uplink transmission rate requested in Configuration Request if Configuration Response is information indicating the supportable range. For example, if 153.6 kbps is requested in Configuration Request, the uplink transmission rate is selected in the range up to 153.6 kbps by the application which operates.

When a connection request is issued from an application (App) 14 operating in the wireless communication terminal installed in the wireless communication terminal to the wireless communication terminal, the connection request (Connection Request) is transmitted from the wireless communication terminal to the wireless base station.

In response to the request, the wireless base station specifies a communication channel (Traffic Channel Assignment), and the wireless communication terminal sets the communication channel and transmits a response signal (Traffic Channel Complete) to establish the communication channel.

Then, the wireless communication terminal requires a communication port in the communication channel (Xon Request), and the wireless base station specifies a communication port (Xon Response) and selects the communication port.

Then, user authentication, etc., is performed in a data link layer according to LCP Configuration, the communication function in a network layer is set according to SN Authentication and IPIC Configuration, PPP (Point to Point Protocol) is set, and the communication between the application and the server (Serv) 20 is established.

When the application is started, data is sent at speed of 64 kbps from the application to the wireless communication terminal because the application requires the transmission rate 64 kbps.

The wireless communication terminal transmits data at speed of 76.8 kbps to the wireless base station.

The uplink data speed is described in the header portion of a data packet transmitted from the wireless communication terminal to the wireless base station. The wireless base station which have received the data packet from the wireless communication terminal refers to the header of the data packet to identify the transmission rate of the packet.

The wireless base station transmits data to the server at the speed 76.8 kbps.

An application program requiring the transmission rate 64 kbps operates in the server. The data is sent at the transmission rate 76.8 kbps from the wireless communication terminal. Thus, the data can be decoded in the server and the application can operate normally.

FIG. 7 shows the description of Configuration Response in the second embodiment of the invention.

Configuration Response to be transmitted as the state information of the base station is provided with an area describing information representing the state of the wireless base station following a message ID (Message ID).

The area involves information (RTCStartRateChangeEnabled) as to whether or not uplink speed information is involved and uplink speed information (ReverseTrafficChannelStart). The description of the uplink speed information (ReverseTrafficChannelStart) is defined like that in the first embodiment (FIG. 5).

Figure 8:
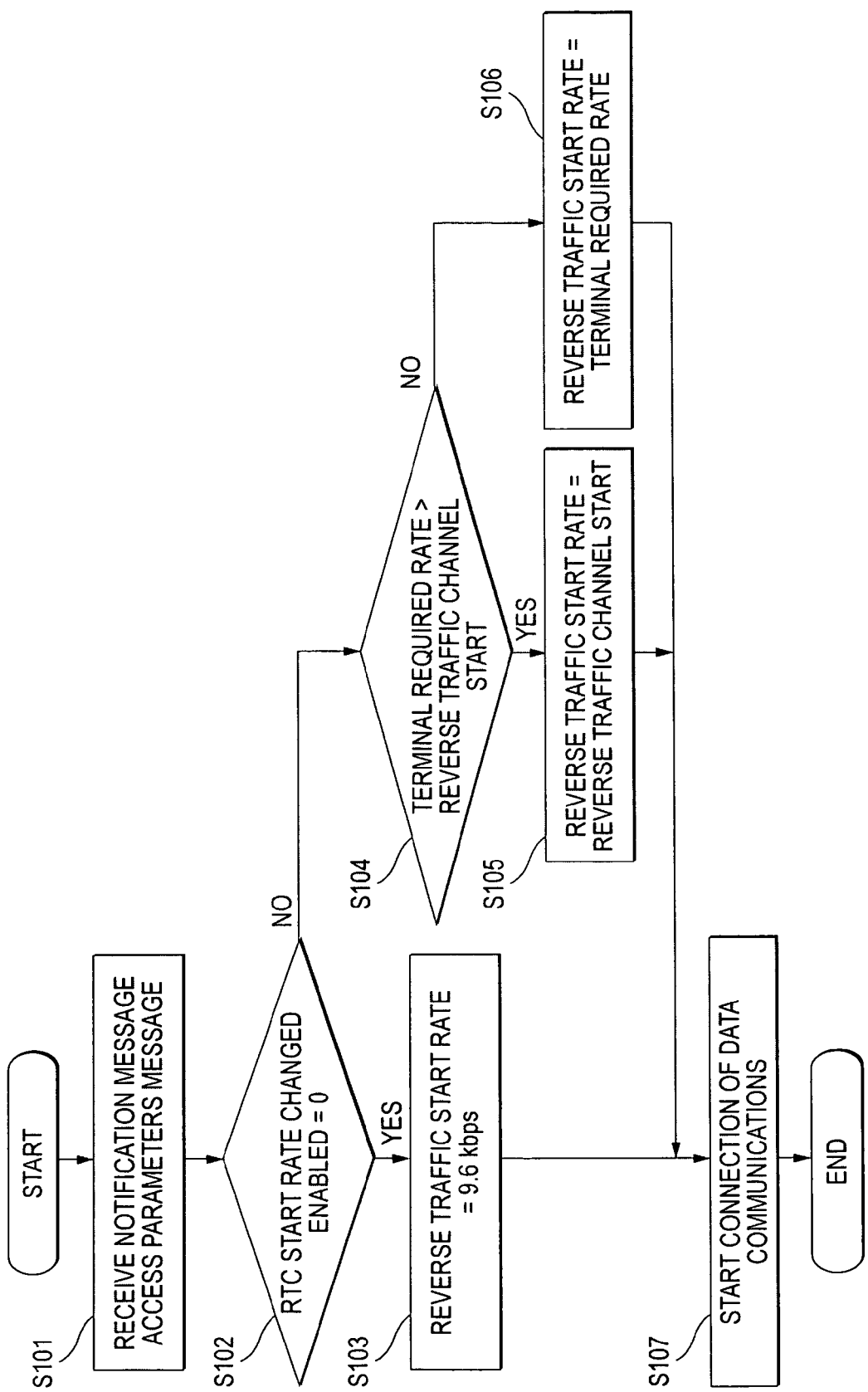
FIG. 8 is a flowchart of a transmission rate determination processing of the embodiment of the invention.
Figure 9:
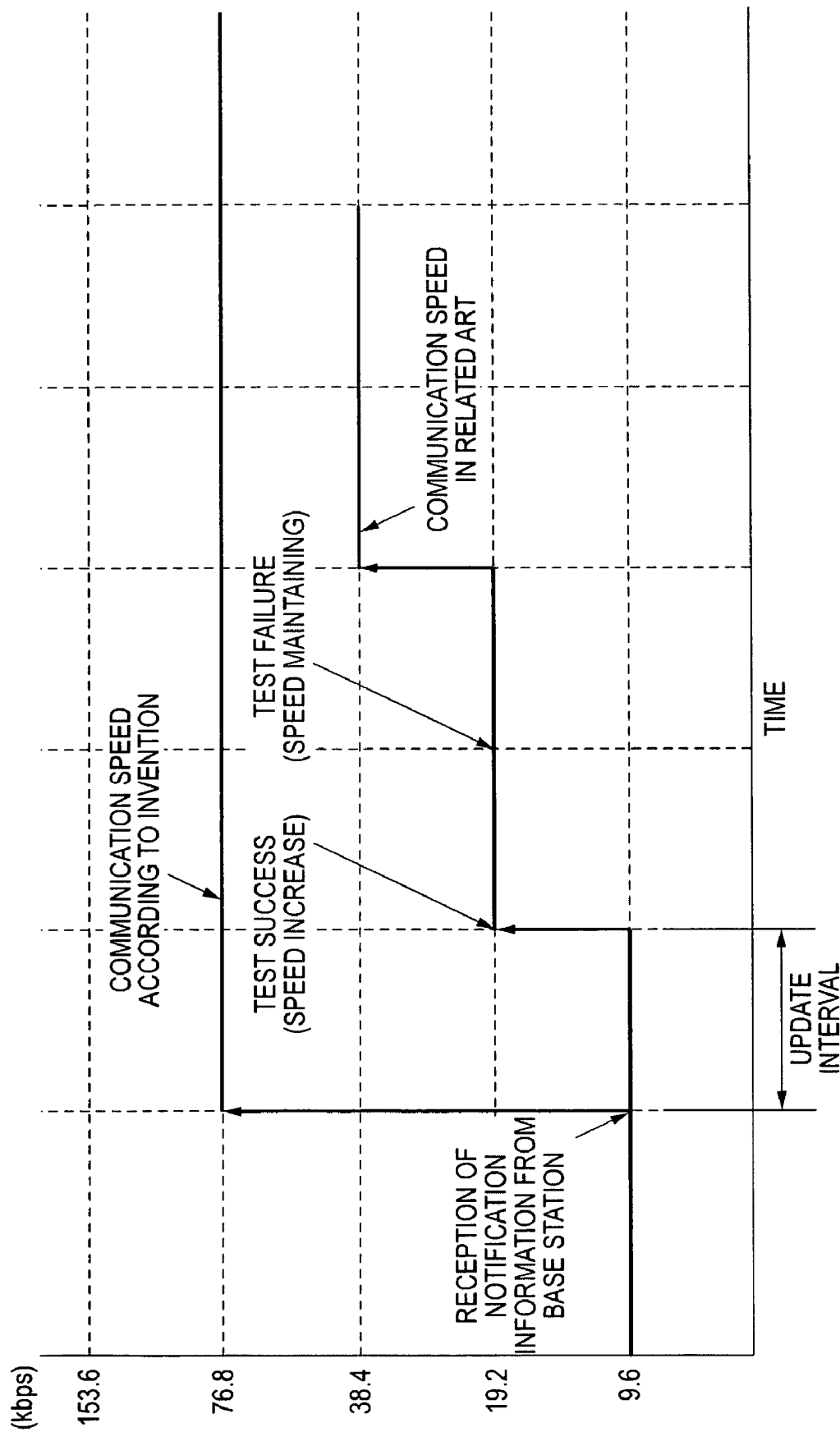
FIG. 9 is a schematic representation of change in uplink transmission rate according to the embodiment of the invention.
Figure 10:
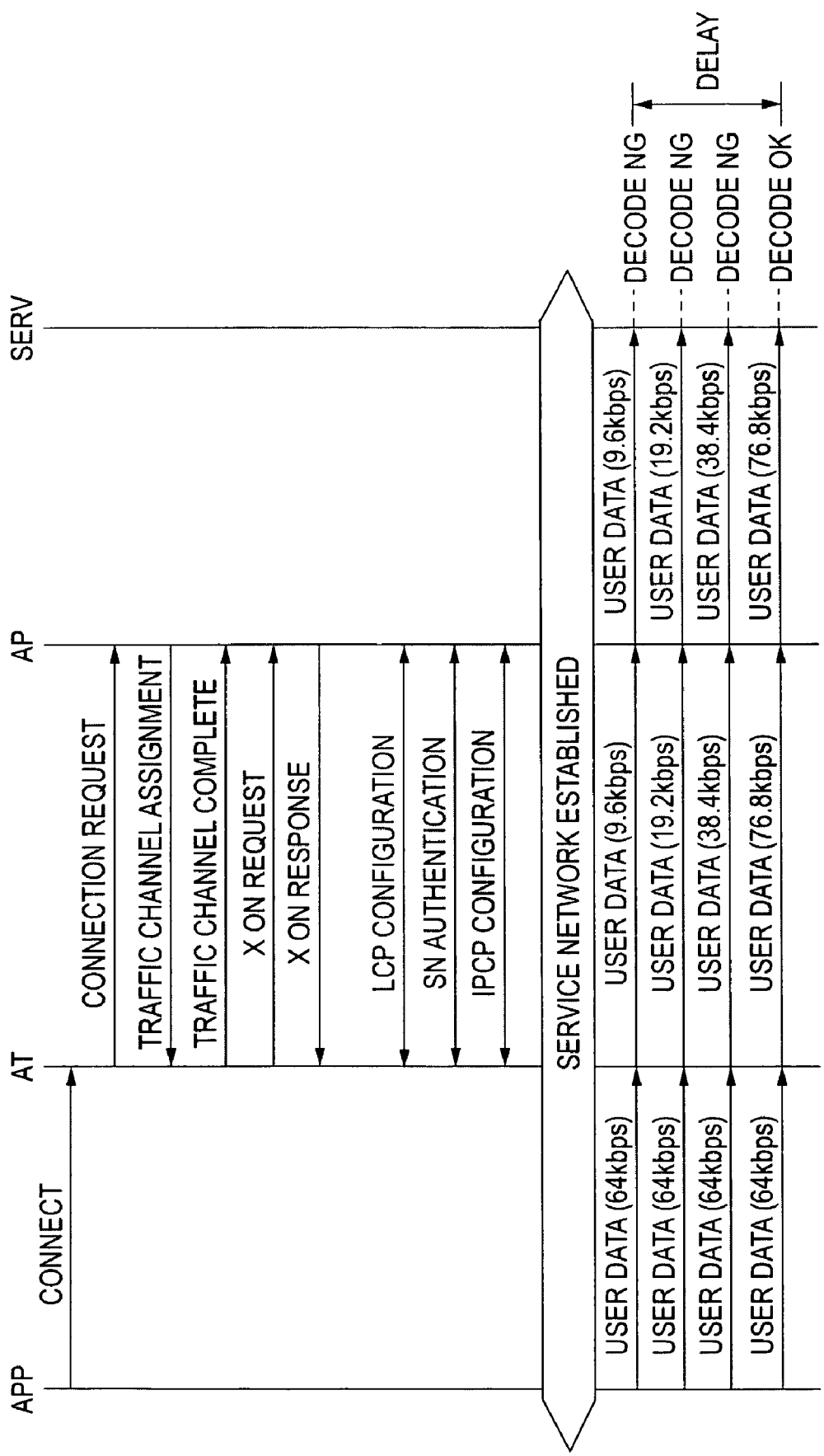
FIG. 10 shows a sequence diagram of a communication system in a related art.

FIG. 8 is a flowchart of a transmission rate determination processing of the embodiment of the invention.

At first, the wireless communication terminal 10 receives a broadcast message and extracts RTCStartRateChangeEnabled (information as to whether or not uplink speed information is involved) and ReverseTrafficChannelStart (uplink speed information) involved in the broadcast message (S101).

Whether or not uplink speed information is involved in the broadcast message is determined (S102).

That is, if the value of RTCStartRateChangeEnabled is 0, uplink speed information is not involved in the broadcast message. Therefore, in this case, the initial value of the uplink transmission rate is set to the lowest value 9.6 kbps (S103).

On the other hand, if the value of RTCStartRateChangeEnabled is not 0, uplink speed information is involved in the broadcast message. Therefore, in this case, ReverseTrafficChannelStart (uplink speed information) involved in the broadcast message and the transmission rate required by the wireless communication terminal 10 are compared (S104).

If the transmission rate required by the wireless communication terminal 10 is greater than ReverseTrafficChannelStart, the initial value of the uplink transmission rate is set to the value defined in ReverseTrafficChannelStart (S105).

On the other hand, if the transmission rate required by the wireless communication terminal 10 is equal to or less than ReverseTrafficChannelStart, the initial value of the uplink transmission rate is set to the transmission rate required by the wireless communication terminal 10 (S106).

When the initial value of the uplink transmission rate is determined, connection of data communications is established (S107) and data communications are started.

While the invention has been described in detail with reference to the specific embodiments, it will be obvious to those skilled in the art that various changes and modifications can be made without departing from the spirit and the scope of the invention.

The present application is based on Japanese Patent Application (No. 2002-357977) filed on Dec. 10, 2002, which is incorporated herein by reference.

INDUSTRIAL APPLICABILITY

According to the invention, the uplink transmission rate can be set to high speed (for example, 76.8 kbps) from the beginning of communications for transmitting data, and an application program requiring a high transmission rate can be used from the communication start time.

As the start speed of the uplink data communications is changed, unnecessary data is not transmitted. Therefore, the whole throughput of the system can be improved.

Since the uplink transmission rate can be previously determined before communications are started, use of application can be started promptly.

The sequence for determining the uplink transmission rate is not complicated.

Since the uplink transmission rate can be determined under the initiative of the wireless communication terminal, the uplink transmission rate is not set to a speed where the application operating in the wireless communication terminal cannot be used.

Since the uplink transmission rate can be determined under the initiative of the wireless communication terminal, the load on the wireless base station can be decreased.

The invention claimed is:

1. A wireless communication system configured from a wireless base station and a wireless communication terminal,
the wireless base station comprises:
a broadcast section that broadcasts information via a broadcast message, wherein the broadcasted information includes an initial uplink transmission resources, and
the wireless communication terminal comprises:
an obtaining section that obtains the initial uplink transmission resources from the broadcasted message; and
a transmission section that transmits data corresponding to the obtained uplink transmission resources.

2. A wireless communication system configured from a wireless base station and a wireless communication terminal, wherein a wireless communication line is set between the wireless base station and the wireless communication terminal,
the wireless communication terminal comprises:
a terminal transmission rate notify section that notifies the wireless base station of a transmission rate required by the wireless communication terminal on the wireless communication line from the wireless communication terminal to the wireless base station; and
a transmission rate determination section that determines transmission rate on the wireless communication line from the wireless communication terminal to the wireless base station, and
the wireless base station comprises:
a determination section that determines whether or not the transmission rate notified from the wireless communication terminal enables to be supported; and
a determination result notify section that notifies the wireless communication terminal of a determination result of the determination section,
wherein the transmission rate determination section determines the initial transmission rate on the wireless communication line from the wireless communication terminal to the wireless base station based on the determination result notified from the wireless base station,
wherein the terminal transmission rate notify section notifies the wireless base station of the transmission rate when the wireless base station and the wireless communication terminal exchange their mutual state information, before a connection request from an application.

3. The wireless communication system according to claim 2, wherein the wireless communication terminal notifies the wireless base station of the transmission rate at a moment when power of the wireless communication terminal is turned on.

4. The wireless communication system according to claim 2 or 3, wherein the terminal transmission rate notify section notifies the wireless base station of a state information request message including the transmission rate.

5. The wireless communication system according to claim 4, wherein the wireless communication terminal comprises a request transmission rate transmission section that retransmits a request of a transmission rate lower than the transmission rate required by the wireless communication terminal when the determination result from the wireless base station section shows that the transmission rate does not enable to be supported.

6. A wireless communication terminal comprising:
an obtaining section that obtains an initial uplink transmission resources from a message broadcasted from a wireless base station via a broadcast message; and
a transmission section that transmits data obtained corresponding to the obtained uplink transmission resources.

7. A wireless communication terminal, wherein a wireless communication line set between a wireless base station and the wireless communication terminal, comprising:
a terminal transmission rate notify section that notifies the wireless base station of an transmission rate required by the wireless communication terminal on the wireless communication line from the wireless communication terminal to the wireless base station;
wherein the terminal transmission rate notify section notifies the wireless base station of the transmission rate when the wireless base station and the wireless communication terminal exchange their mutual state information, before a connection request from an application; and
a transmission rate determination section that determines a transmission rate on the wireless communication line from the wireless communication terminal to the wireless base station based on a determination result as to whether or not the wireless base station enables to support the transmission rate notified from the wireless communication terminal.

8. The wireless communication terminal according to claim 7, wherein when power of the wireless communication terminal is turned on, the wireless communication terminal notifies the wireless base station of the transmission rate.

9. The wireless communication terminal according to claim 7 or 8, wherein the terminal transmission rate notify section notifies the wireless base station of a state information request message including the transmission rate.

10. The wireless communication terminal according to claim 9, comprising:
a request transmission rate transmission section that retransmits a request of a transmission rate lower than the transmission rate required by the wireless communication terminal when the determination result from the wireless base station section shows that the transmission rate does not enable to be supported.

11. A wireless base station for performing communications, comprising:
a broadcast section that broadcasts information via a broadcast message, wherein the broadcasted information includes an uplink transmission resources; and
wherein the wireless communication terminal can obtain the initial uplink transmission resources from the broadcasted message.

12. A method of a wireless communication system configured from a wireless base station and a wireless communication terminal,
the wireless base station comprises:
broadcasting information via a broadcast message, wherein the broadcasted information includes an uplink transmission resources, and
the wireless communication terminal comprises:
obtaining the uplink transmission resources from the broadcasted message; and
transmitting data corresponding to the obtained uplink transmission resources.

13. A transmission rate control method of a wireless communication system configured from a wireless base station and a wireless communication terminal, wherein a wireless communication line is set between the wireless base station and the wireless communication terminal,
the transmission rate control method includes the steps in which:

the wireless communication terminal notifies the wireless base station of a transmission rate required by the wireless communication terminal on the wireless communication line from the wireless communication terminal to the wireless base station; wherein the wireless communication terminal notifies the wireless base station of the transmission rate when the wireless base station and the wireless communication terminal exchange their mutual state information, before a connection request from an application;

the wireless communication terminal determines a transmission rate on the wireless communication line from the wireless communication terminal to the wireless base station;

the wireless base station determines whether or not the transmission rate notified from the wireless communication terminal enables to be supported;

the wireless base station notifies the wireless communication terminal of a determination result of the determination section; and the wireless communication terminal determines the transmission rate on the wireless communication line from the wireless communication terminal to the wireless base station based on the determination result notified from the wireless base station.

14. The transmission rate control method according to the claim 13, wherein the wireless communication terminal notifies the wireless base station of the transmission rate when power of the wireless communication terminal is turned on.

15. The wireless communication system according to claim 13 or 14, wherein the terminal transmission rate notify section notifies the wireless base station of a state information request message including the transmission rate.

16. The wireless communication system according to claim 15, wherein the wireless communication terminal retransmits a request of a transmission rate lower than the transmission rate required by the wireless communication terminal when the determination result from the wireless base station section shows that the transmission rate does not enable to be supported.

* * * * *